(12) United States Patent
Harvey

(10) Patent No.: US 11,041,771 B2
(45) Date of Patent: Jun. 22, 2021

(54) METHOD AND APPARATUS FOR DETERMINING LINE SAG IN A CONDUCTOR SPAN

(71) Applicant: Quanta Associates, L.P., Houston, TX (US)

(72) Inventor: Benjamin James Harvey, Langley (CA)

(73) Assignee: Quanta Associates, L.P., Houston, TX (US)

( * ) Notice: Subject to any disclaimer, the term of this patent is extended or adjusted under 35 U.S.C. 154(b) by 0 days.

(21) Appl. No.: 16/368,460

(22) Filed: Mar. 28, 2019

(65) Prior Publication Data

US 2019/0301953 A1     Oct. 3, 2019

Related U.S. Application Data

(60) Provisional application No. 62/651,481, filed on Apr. 2, 2018.

(30) Foreign Application Priority Data

Mar. 28, 2018   (CA) ................................. CA 2999575

(51) Int. Cl.
    *G01L 5/04*              (2006.01)
    *G01L 5/06*              (2006.01)

(52) U.S. Cl.
    CPC ................. *G01L 5/047* (2013.01); *G01L 5/06* (2013.01)

(58) Field of Classification Search
    CPC .......................... G01L 5/04–108; G01L 5/042
    See application file for complete search history.

(56) References Cited

U.S. PATENT DOCUMENTS

| | | | | |
|---|---|---|---|---|
| 4,158,962 A | * | 6/1979 | Conoval ................. | G01L 5/042 73/862.41 |
| 4,379,226 A | * | 4/1983 | Sichling ................. | G01D 5/268 250/231.1 |
| 4,565,099 A | * | 1/1986 | Arnold .................... | G01L 5/042 73/862.41 |
| 4,960,001 A | * | 10/1990 | Vemmer ................. | G01L 5/101 73/862.392 |

(Continued)

OTHER PUBLICATIONS

Gulbis, Janis, "Data Visualization—How to pick the right chart type?" (accessed at https://eazybi.com/blog/data_visualization_and_chart_types/ ), Mar. 1, 2016, 16 pages, eazyBI, Latvia.

(Continued)

*Primary Examiner* — Tran M. Tran
(74) *Attorney, Agent, or Firm* — Oathout Law Firm; Mark A. Oathout; Antony C. Edwards

(57) ABSTRACT

A method and apparatus for calculating line sag in a span of a conductor is provided. The method includes using a portable smart device having one or more accelerometers and running a line sag application on the processing device. The line sag application enables acceleration data of return waves generated on the conductor to be collected using the smart device and to be plotted as a function of time for display on the smart device. The method further includes placement of time markers on the plotted data displayed on the smart device to determine elapsed time and calculating line sag using the elapsed time.

10 Claims, 7 Drawing Sheets

(56) References Cited

U.S. PATENT DOCUMENTS

| | | | | |
|---|---|---|---|---|
| 4,979,125 A * | 12/1990 | Kwun | ............... | B65H 63/06 |
| | | | | 702/35 |
| 5,454,272 A | 10/1995 | Miller et al. | | |
| 5,710,432 A * | 1/1998 | Bell | ............... | G01L 5/042 |
| | | | | 250/559.32 |
| 5,731,528 A * | 3/1998 | Yamazaki | ............... | G01L 5/042 |
| | | | | 73/828 |
| 6,205,867 B1 | 3/2001 | Hayes et al. | | |
| 7,478,563 B2 * | 1/2009 | Weisman | ............... | G01L 5/042 |
| | | | | 73/786 |
| 8,184,015 B2 | 5/2012 | Lilien et al. | | |
| 9,158,036 B2 | 10/2015 | Liu et al. | | |
| 9,464,949 B2 | 10/2016 | Mahlen et al. | | |
| 9,488,670 B2 | 11/2016 | Chan et al. | | |
| 10,041,968 B2 | 8/2018 | Nulty | | |
| 10,451,770 B2 * | 10/2019 | Godard | ............... | G01L 5/107 |
| 2012/0197589 A1 | 8/2012 | Kansala et al. | | |
| 2017/0227677 A1 | 8/2017 | Godard | | |
| 2019/0235011 A1 * | 8/2019 | Pinney | ............... | G01W 1/00 |
| 2019/0288496 A1 * | 9/2019 | Hansen | ............... | H02G 7/02 |

OTHER PUBLICATIONS

Gupta, Sandeep et al., "Transmission Line Sag Calculation with Ampacities of Different Conductors" Abstract (accessed at https://link.springer.com/chapter/10.1007/978-981-13/2035-4_19), Applications of Computing and Communication Technologies ICACCT 2018, Aug. 30, 2018, 5 pages, Communications in Computer and Information Science, vol. 899, Springer, Singapore.

Southwire, Guide for the Installation of Bare Overhead Conductors, Overhead Conductor Manual, Aug. 10, 2017, pp. 1-11, Southwire, United States.

Grigsby, Leonard L., The Electric Power Engineering Handbook: Electric Power Generation, Transmission, and Distribution 3rd Edition, May 16, 2012, 769 pages, CRC Press, United States.

IEEE Standards Association, IEEE 524-2003—IEEE Guide to the Installation of Overhead Transmission Line Conductors (accessed at https://standards.ieee.org/standard/524-2003.html), Mar. 11, 2004, 6 pages, IEEE, United States.

* cited by examiner

METHOD AND APPARATUS FOR DETERMINING LINE SAG IN A CONDUCTOR SPAN

CROSS-REFERENCE TO RELATED APPLICATIONS

This application claims priority from U.S. Provisional Patent Application No. 62/651,481 filed on Apr. 2, 2018 and Canadian Patent Application No. 2,999,575 filed on Mar. 28, 2018 both entitled, "Method and Apparatus for Determining Line Sag in a Conductor Span". Entireties of the applications identified in this section are incorporated herein by reference.

TECHNICAL FIELD

This disclosure relates to the field of power line construction, maintenance and services, and in particular to the determination of the amount of line sag in a power line conductor span.

BACKGROUND

It is known in the prior art to calculate the line sag of a conductor using the time it takes for a travelling wave to travel along and return from one end to the other of a conductor span. U.S. Pat. No. 5,454,272 to Miller et al. requires mounting an impactor and at least one, and preferably two, motion sensors mounted on the conductor being impacted by the impactor. The impactor causes a travelling wave along the conductor. The motion sensors detect the wave amplitude and timing.

Miller discusses a mathematical formula, described as being known in the art, for the calculation of the line sag. The calculated line sag is proportional to the square of the wave travel time. Miller discloses that the travelling wave can be caused by pulling down on the conductor and recording the return travel time.

IEEE Standard 524-2003, published 12 Mar. 2004, and entitled "IEEE Guide to the Installation of Overhead Line Conductors", at page 62 describes: The stopwatch or sagwatch method is a quick and accurate means of checking sag. This method involves jerking or striking the conductor and measuring the time it takes the shock wave to be reflected back to the initial point. Usually, three or five return waves provide an accurate measurement of the tension in the span. This method is most effective on small conductors and shorter spans. This method is also sometimes difficult on lines with long unbraced horizontal post insulators because the insulators may absorb too much wave energy and make it difficult to detect multiple return waves.

Quanta Energized Services provides a training manual for linemen in barehand procedures. The manual dated Jul. 10, 2015 and entitled "Barehand Training Manual" in Appendix A2, page 66 describes line sag measurement by using a stopwatch. The manual states that the return wave method of checking the sag in a conductor is applicable regardless of the span length, tension, size, or type of conductor, and that the time required for a wave initiated on a conductor, suspended in air between two fixed supports, to traverse between the supports is dependent on the amount of conductor sag. The manual states that a conductor wave originating at one support will travel to the next support where it will be reflected back to the point of origin where it will again be reflected back to the adjacent support, and that the cycle repeats until the wave is eventually damped out.

The manual describes striking the conductor with a blow close to one support point (approximately 8 feet to 12 feet from the support point) and simultaneously starting the stopwatch. Striking the conductor is described as causing a wave to travel from the near support to the far one, where it is reflected. The manual instructs that at the third return of the wave, stopping the stopwatch and reading the time, in seconds, required for the wave to travel out and back three times. The relationship between the time required for a conductor wave to travel three times between supports and the conductor's sag is described as being given by the equation: Sag (in feet) equals the time (in seconds) squared, divided by 9.

This method is described in the manual as particularly valuable for checking sag in spans of normal length, and as not being as satisfactory when used on very large conductors in long spans because of the greater energy required to set up a wave which can readily be felt after it has traveled from one support to the other, three times.

The manual further describes that on a "hot" (i.e., energized) line the impulse can be given and felt by means of a dry tested rope thrown over the conductor 8 feet to 12 feet from the point of support.

Thus, for example, three return waves timed at collectively 9.24 seconds in a 613 foot span of 4/0 ACSR at 0.29 pounds per foot. Applying the formula: the collective 9.24 seconds was squared and then divided by nine. The result was 9.49 feet of sag in the span. An inaccuracy in a time measurement resulting in a measurement of, for example, 10.0 seconds becomes a predicted sag of 11.1 feet, i.e., 1.6 feet more than the actual sag, an inaccuracy of 17 percent. Hence, both sensitivity to the impulse of a returning wave and accuracy of time measurement is desirable in order to consistently obtain accurate line sag measurement.

Applicant is also aware of U.S. Pat. No. 9,464,949 to Mahlen et al. entitled "Wire Timing and Tensioning Device", the entirety of which is incorporated herein by reference. Mahlen describes his method, device and system as being semi-automated. The device is attached to a tensioned line and is used to measure a total time delay of an induced mechanical wave in the tensioned line. The total time delay is then compared to a sag-tension chart by a user to determine the line sag.

SUMMARY

Accordingly, in one broad aspect, a method for calculating line sag in a power line suspended between at least two supports is provided. The method comprises providing a smart device having an accelerometer, a display, an user interface, a processor, a memory, and at least one application residing in the memory. The method further comprises temporarily coupling the smart device to the power line and launching the at least one resident application. Further, a mechanical wave is induced on the power line by pulling the smart device, while coupled to the power line, in a substantially vertical direction. The mechanical wave generates a plurality of return waves in the power line. Acceleration of a subset of the plurality of return waves and corresponding vertical acceleration of the smart device is recorded. Each return wave of the subset of return waves has multiple, and the same number of harmonics. Timings of the subset of return waves are recorded. Within the at least one resident application, and using the recorded acceleration and timings, a graphical waveform representation of the subset of return waves is generated and the graphical waveform representation is displayed on the display. Using the user interface, the displayed graphical waveform representation is magnified so as to view the harmonics of each of the subset of return waves. A harmonic of a first return wave of the subset of return waves is selected and using the user interface a start marker is placed on a displayed inflection (for example, a peak or valley) of the selected harmonic of the first return wave. A harmonic of a second return wave of the subset of return waves is selected and, using the user interface, a stop marker is placed on a corresponding inflection of the corresponding selected harmonic of the second return wave. Then, within the resident application, a time delay is calculated between the start marker and the stop marker, and the line sag is calculated using the time delay.

Accordingly, in another broad aspect, a portable, modular system for calculating line sag in a power line suspended between at least two supports is provided. The system comprises a smart device including an accelerometer, a display and an user interface. The system further comprises a coupler for temporarily coupling the smart device to the power line; and at least one executable application resident or adapted to be resident in the smart device. The application, in operation, performs the following steps: records acceleration of a subset of a plurality of return waves generated in the power line and corresponding vertical acceleration of the smart device when coupled to the power line; records timings of the subset of return waves; generates a graphical waveform representation of the subset of return waves using the recorded acceleration and timings and displays it on the display. Each return wave of the subset of return waves has multiple, and the same number of harmonics. The application also calculates a time delay between a start marker and a stop marker placed on inflections (for example, peaks or valleys) of selected corresponding harmonics of the subset of return waves; and calculates the line sag using the time delay. The amount of the calculated line sag is then displayed.

BRIEF DESCRIPTION OF THE DRAWINGS

FIG. 1A shows coupling of a smart device to the power line by a user;

DETAILED DESCRIPTION

Figures 1A, 1B:
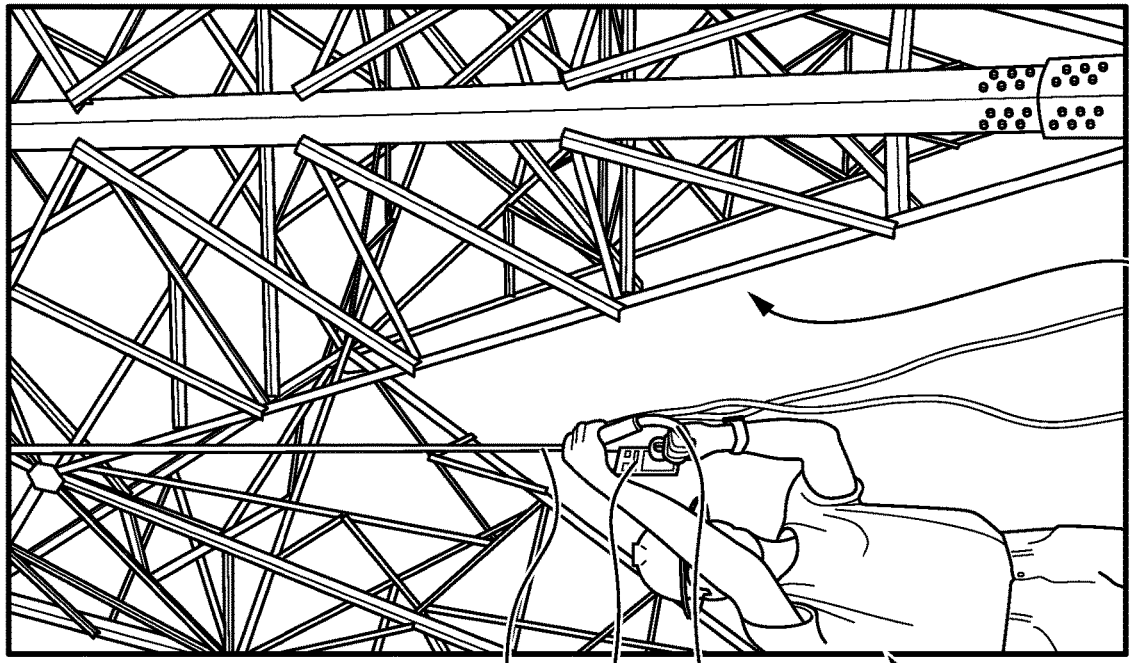
FIG. 1A is an illustration of one embodiment of a method for calculating line sag in a power line.
FIG. 1B illustrates launching of an application resident on the smart device of FIG. 1A by the user.

The presently disclosed application and its method of use which results in a calculation of line sag in a conductor takes advantage of the presence of accelerometers in portable or hand-held electronics such as cell phones or so-called smart phones or small tablet computers or other smart devices and the like (herein also referred to as a "hand-held processing device" or "device", or alternatively as a "phone").

As used herein, the term "tablet", "smart phone", "smartphone platform", "smart device" or "smart phone-type device/system" means a mobile apparatus that is capable of running a programmed application suitable for executing the embodied functionality. While suitable traditional smart phones and tablets may include products such as, e.g., the iPhone™, iPad™ which are products of Apple, Inc.™, Android-based devices, and other commercially available devices and associated operating systems, the term "smart device" as discussed and embodied herein is intended to include any digital mobile device such as smart phones, tablets, phablets, smart watches, and other current or future "smart phone" platforms having similar functionality. In order to be especially useful and convenient, in one preferred embodiment the smart device is relatively small, so as to fit in a clothing pocket for example, and thus does not have an overly large display screen. Where the display screen is relatively small, for example a few inches, or up to five inches, measured diagonally across the screen, it has been found advantageous if the screen is a touch sensitive screen and where the device operating system accepts zoom-in (magnify) and zoom-out commands using touch control so that a displayed graph and data on the graph may be magnified to see data detail not otherwise easily seen by the user.

As will be understood by a person skilled in the art a smart device, in addition to accelerometers and a display, typically includes a user interface, a processor and a memory. The user interface advantageously may be a touch sensitive screen, or may include a keyboard, a mouse, or a button or buttons, but it is not limited thereto.

The accelerometers in the device interact with the display on the device so as to orient the display on the device for ease of viewing or reading no matter which way the device's display screen is oriented in a vertical plane. The accelerometers use the acceleration due to gravity to detect a downwards direction and this information is used by the device's processor to orient the displayed data so that what is intended to be downwards in the displayed image is in fact oriented downwardly on the display's screen. Many conventional programs or applications running in such hand-held processing devices use the accelerometer data. It is thus known to one skilled in the art when programming applications to use the accelerometer data for the purposes of orienting a display or, in game-play, for the detection of movement of the device which signals input from the user to interact with the game or other applications.

In the present disclosure a line sag application or "app" which is resident in the device memory uses the accelerometer data from the accelerometers in the device for at least two purposes. Firstly, as is conventional, the accelerometers detect the downwards direction. Secondly, the accelerometers detect vertical acceleration due to firstly, a downward force imparted manually to a conductor line or power line at one end of a span, and, secondly, the impulses due to the returning travelling waves in the conductor.

Thus, as seen in FIG. 1A, a user 10, who is standing on the ground grasps a pulling rope 12 or other preferably dielectric pulling member which has been suspended downwardly from one end of an over-head supported conductor span or power line (not shown). With the hand-held smart device 14 coupled to the lower end of the rope, and with the line sag app (better described below) started by user 10 pushing the start button (labelled start) on the display 14*a* as seen in FIG. 1B, the user pulls sharply down once on the rope 12. Advantageously, the upper end of the rope is affixed to the conductor about eight feet (approximately three meters) out along the conductor from the insulators suspending the conductor from the support structure, which may be a tower 16. In one embodiment, the power line is suspended between two support structures.

The device 14 may be coupled to the rope 12 at a height on the rope convenient for the user 10. The coupling of the device to the rope 12 may, as shown in FIG. 1A-3, be as simple as the user merely holding the device 14 against or adjacent to the rope 12 while simultaneously holding the rope 12 so that any vertical movement of the rope 12 also simultaneously moves the device 14 correspondingly vertically. The device may also be temporarily mechanically coupled to the rope. For example, although not illustrated, the device may be held snugly in a case, sleeve or sheath and clipped, for example by a carabiner 12*a*, or adhered, for example by hook-and-loop releasable fasteners, to the rope 12. For the former, the rope 12 may have a loop formed in it, for example located at approximately shoulder height relative to the user, to assist in coupling the device 14 to the rope 12 using the carabiner 12*a*. Other forms of releasable couplers will also work; for example where one end of a coupling device, such as a male/female mating clip, is attached to the rope. The coupling device may be attached to the rope for example by the use of a releasable clamp, or by tying or lashing to the rope, or by a base mounted to the rope. With one end of the clip thus mounted to the rope and with the other end of the clip mounted to the device, the device 14 may be releasably secured to the rope.

Figure 2B:
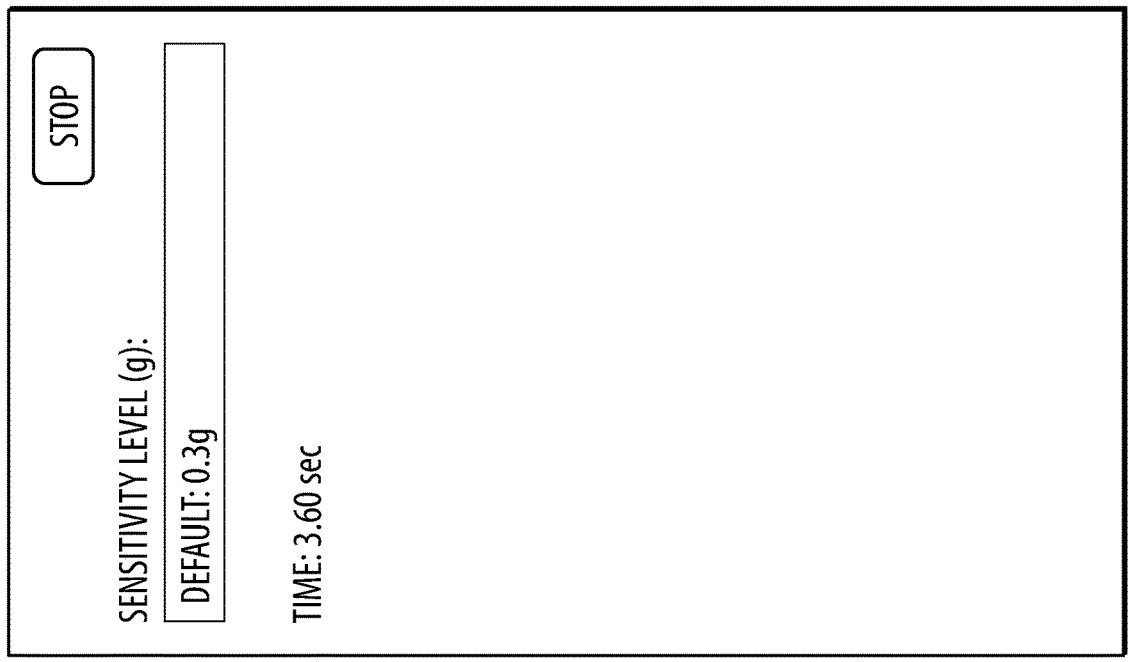
FIG. 2B illustrates a screen of the smart device of FIG. 1A displaying aspects of the application after the same has been launched.

Whether or not employing a clip or otherwise securing the device 14 to the rope 12, as seen in FIG. 1A the user 10 may stabilize the device 14 against the rope by grasping the device 14 so as to pin or wedge it against the rope 12. With the device 14 thus temporarily anchored to the rope by any of the above coupling means, and with the line sag app started as seen in FIG. 2B, the user 10 then pulls down on the rope 12 in direction A (see FIG. 2A) to create or induce the initial impulse to the conductor and corresponding initial wave acceleration 18 in the conductor.

The device 14 remains coupled to the rope 12 until a travelling wave generated by acceleration 18 has travelled along the conductor span and has been reflected back, advantageously until two or more, and preferably three return waves have been reflected back along the conductor to the user's position where the rope is connected to the conductor. As used herein, the end of conductor where user 10 is located is also referred to as the first end or wave generating end of the conductor. Each reflected wave as it returns along the conductor to the first end causes an upward kick or bump acceleration in the conductor briefly lifting the rope 12 as it passes thereby causing an upward acceleration of the device 14. The accelerometers in the device are sensitive and detect the upward acceleration caused by each bump, including even a small amplitude wave (e.g. the third returning wave). The corresponding accelerometer data is recorded and displayed by the app as a plot of vertical acceleration over time to show the magnitude of each returning wave as an acceleration profile over time, such as seen in herein by way of example in FIGS. 4-7.

Figure 2A:
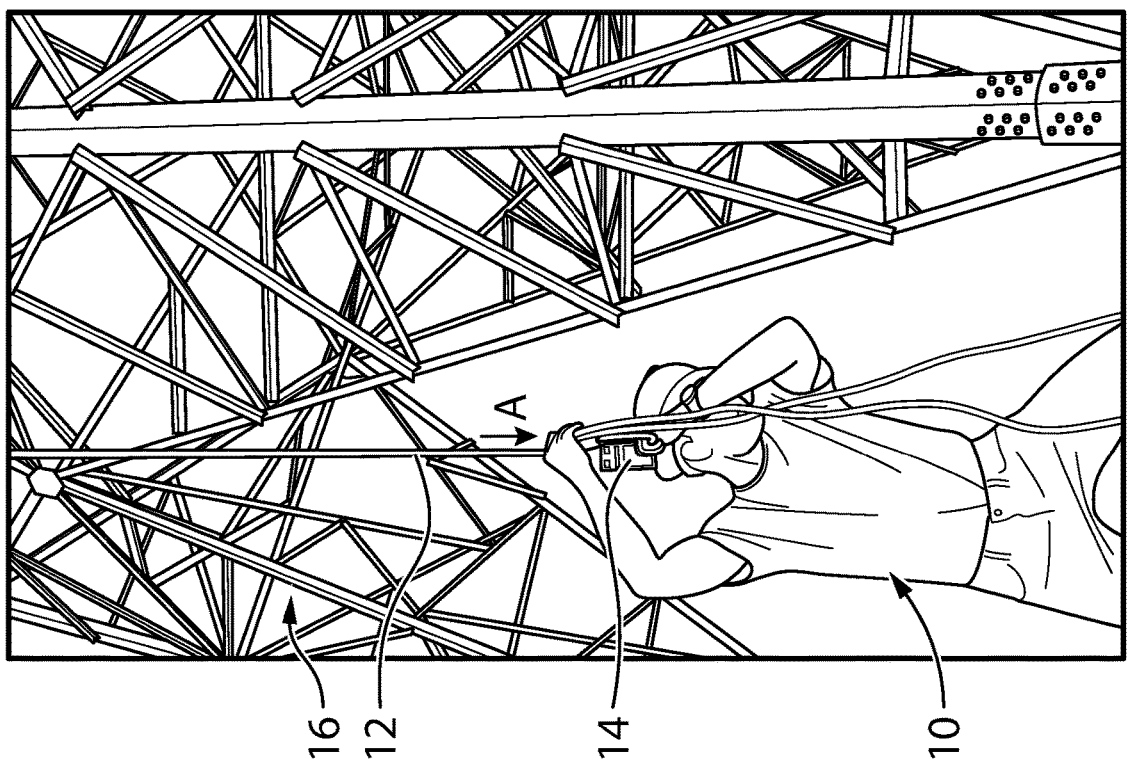
FIG. 2A illustrates the user pulling the smart device to induce a mechanical wave in the power line.
Figure 3:
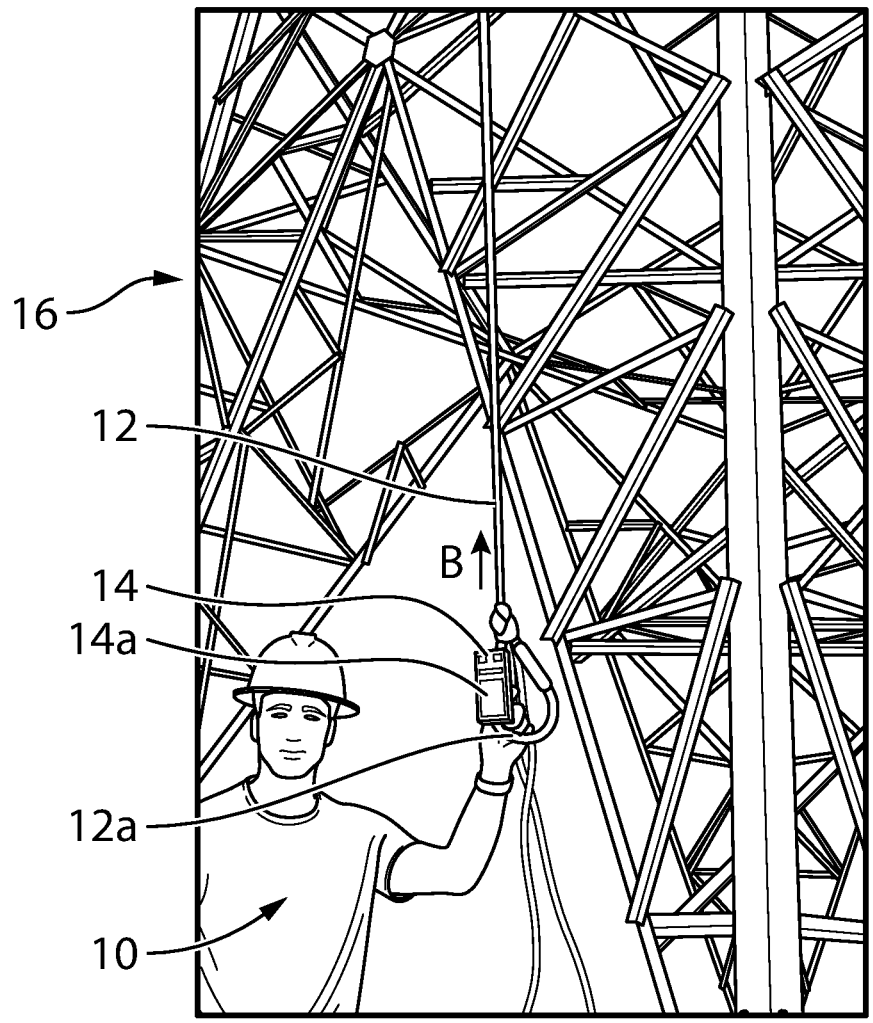
FIG. 3 illustrates the user holding onto the smart device of FIG. 1A for recording acceleration and timing of a subset of return waves generated by the mechanical wave.
Figure 4:
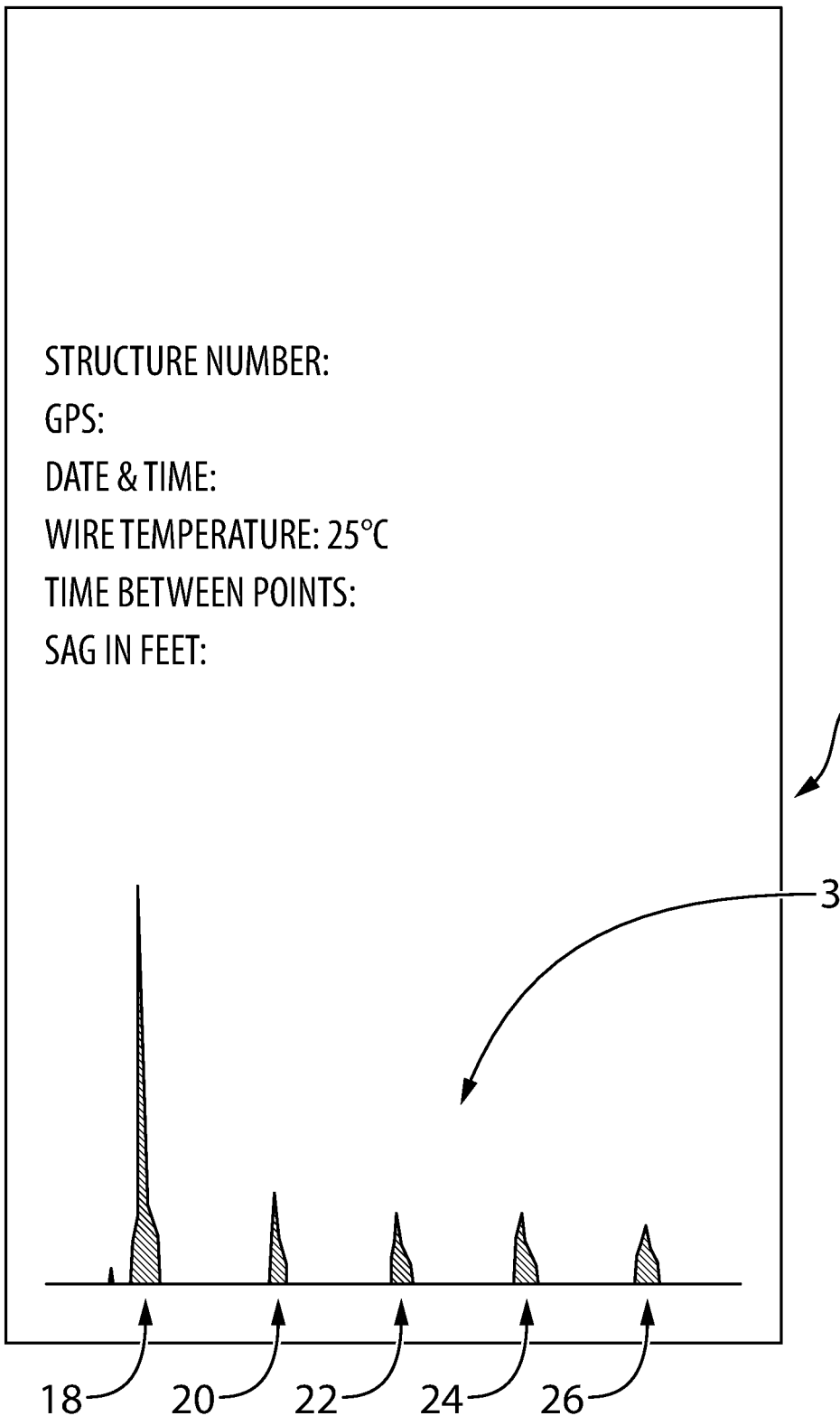
FIG. 4 depicts a graphical waveform representation of the induced mechanical wave and the subset of return waves as displayed on the screen of the smart device of FIG. 1A.

Without intending to be limiting, using the illustrated example of the device 14 remaining coupled to rope 12 until acceleration data has been captured for a subset of return waves such as four returning waves, the device display 14*a* in FIG. 4 shows a plot of the acceleration profile over time as detected by the accelerometers in device 14. The initial acceleration spike of the initial wave impulse 18 is shown at the left side of the display 14*a*. The initial acceleration spike is the result of the user 10 pulling sharply downwardly on rope 12 as shown in FIG. 2A. User 10 then waits for the return waves returning after being reflected back toward the user along the conductor. Each returning wave is felt by the user 10 and the device 14 as an upward kick, bump or tug in direction B of rope 12. Thus in FIG. 4 the corresponding return wave profiles 20, 22, 24, 26 for the first, second, third and fourth return waves respectively are shown sequentially from the left to the right on the device display 14*a*. In this example, time is recorded along axis C so as to provide the time difference between the first and last of the recorded returning waves. The time difference is then used to calculate the line sag in the corresponding conductor span.

Because, as described above, the line sag determination is proportional to the square of the recorded elapsed time (i.e., line sag is proportional to elapsed time squared), the accuracy of reading the time is important to the accuracy of the determination of the amount line sag in the span. Thus errors in the reading of the time are amplified as the amount of error in time recorded, is squared. In one aspect of the present method the accuracy is improved by the use of an acceleration profile vs. time plot on the display. The illustrated acceleration profiles are those of the returning waves; e.g. 20, 22, 24, 26. Each returning wave, when enlarged, is made up of a grouping of small waves or harmonics. Each consecutive grouping of harmonics has a similar acceleration over time profile; with substantially only the wave amplitude of each subsequent grouping of harmonics decreasing as between subsequent profiles for the first, second, third, etc. returning wave. Thus the present method, in one aspect, which is not intended to be limiting, takes advantage of this tendency of each of the returning waves to have a similar waveform profile which merely reduce in amplitude due to the damping of the wave energy with each successive returning wave. The similar outline of these returning waveform profiles for returning waves 20, 22, 24, 26 are seen in FIGS. 4 and 5, and as enlarged in FIGS. 6 and 7.

Figure 6:
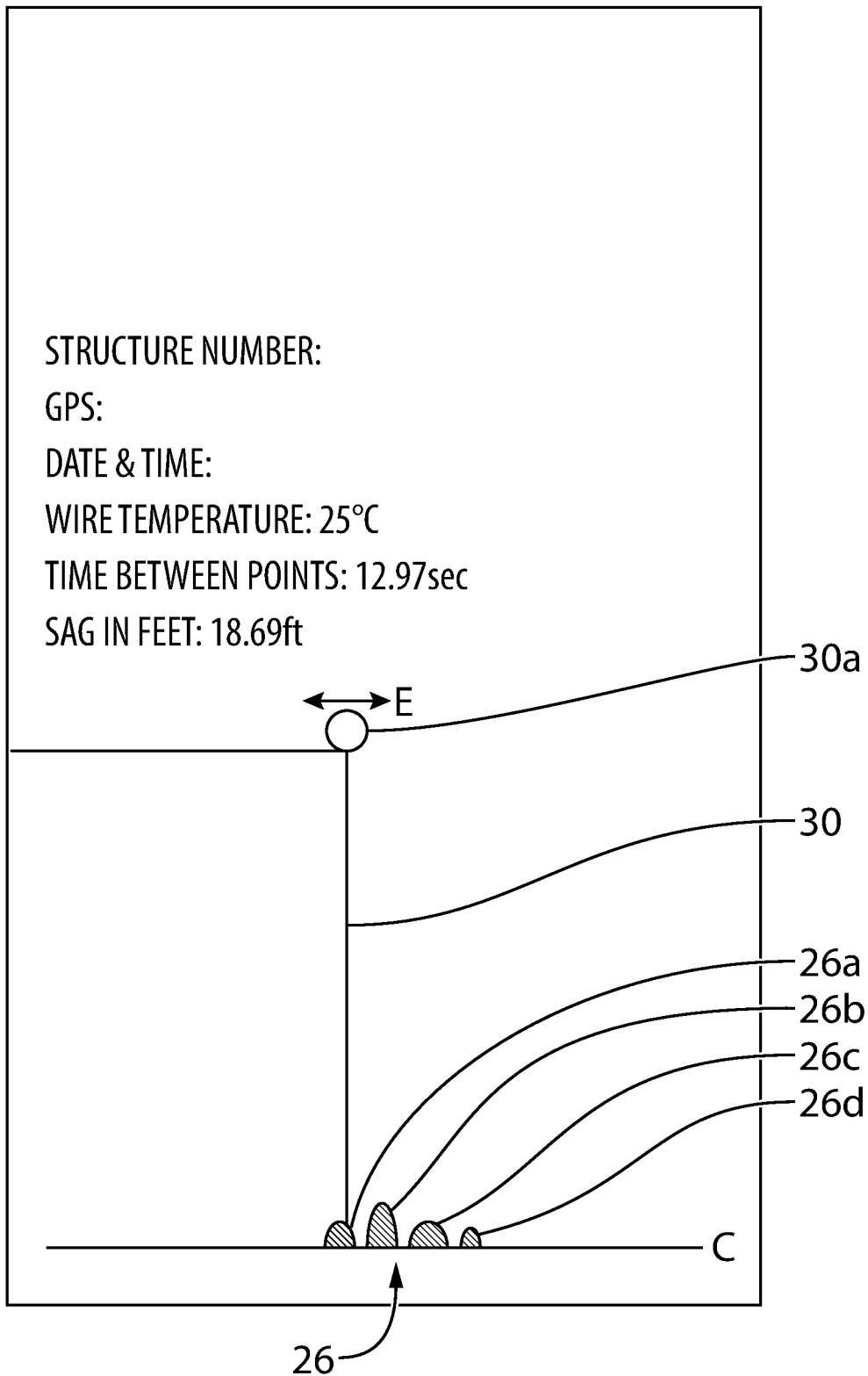
FIG. 6 illustrates wave grouping or harmonics of a first return wave.
Figure 7:
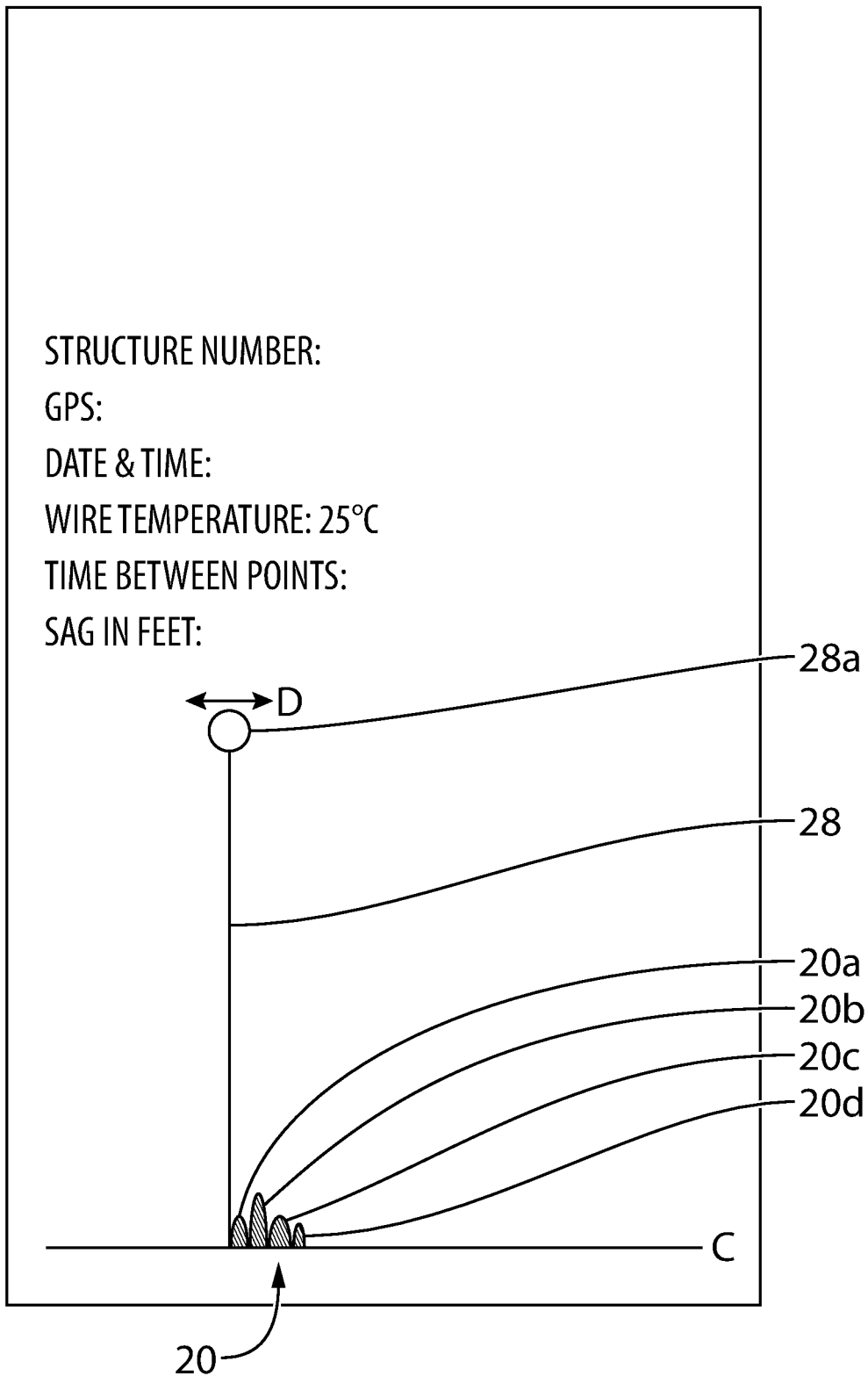
FIG. 7 illustrates wave grouping or harmonics of a second return wave.

As seen in FIGS. 6 and 7, the displayed waveform of the returning waves have been expanded or enlarged for ease of viewing of the harmonics of the returning waves, for example by using a conventional zooming function on the device display 14*a*. Where the device 14 is a touch screen smart phone on some devices 14 zooming or expanding may be done by figure gesture such as a two finger spreading motion on the display touch sensitive screen. Spreading the fingers while in contact with the touch sensitive screen enlarges or zooms the display between the contact points of the fingers. A person skilled in the art will understand that the magnifying function may be achieved using user interfaces other than a touch sensitive screen, for example, a keyboard, a mouse, or a button, but it is not limited thereto. The user input via the user input interface may include a touch, a zoom-in, a zoom-out, or a swipe operation using a touch sensitive screen, but it is not limited thereto. The user input via the user input interface may include a click, a double click, or a drag and drop operation, but it is not limited thereto, as other interface functions such as voice commands will also work.

As seen in the enlarged views of FIGS. 6 and 7, the waveforms of the harmonics of the returning waves have multiple adjacent peaks within each wave's acceleration profile. For example, wave 26 has multiple harmonics having peaks 26a-26d as seen in FIG. 6, and wave 20 has corresponding multiple harmonics having peaks 20a-20d as seen in FIG. 7. The displayed timer function allows the user to first place a start-timer marker 28 on a peak of a chosen harmonic (e.g., the first peak 20a) of the first returning wave 20 using the user interface which in the embodiments described herein is a touch sensitive screen. The user then places a stop-timer marker 30 on a peak of a chosen harmonic (e.g., the first peak 26a) of the fourth returning wave 26. The chosen harmonics (e.g. peaks 20a, 26a) on the first and fourth returning waves have similar profiles. Thus placing the timer start and stop markers (which dictate the measured time increment there-between) on corresponding harmonics, and in the same position on each harmonic, increases the accuracy of the time delay calculation. As explained in the Background, accuracy of time measurement is an important aspect in obtaining an accurate line sag measurement because the line sag is proportional to the square of the time. Since the method described herein enables the user to locate the markers on corresponding peaks of (or corresponding valleys between) harmonics that have the same profile, and the same relative position within each returning wave, accuracy of time measurement is increased. Calculation of the time measurement is not random but is intended to be between specific corresponding harmonics.

Figure 5:
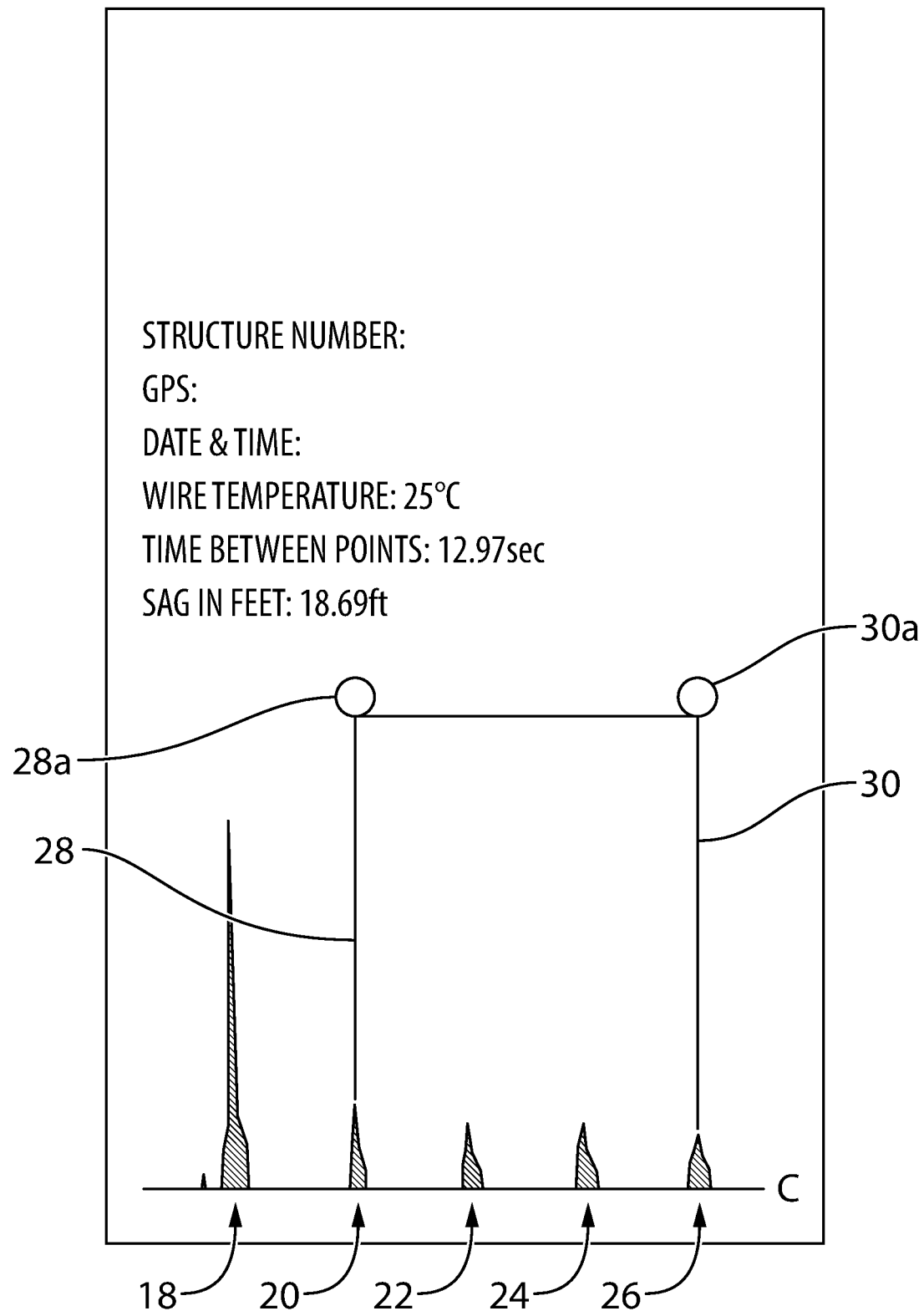
FIG. 5 illustrates placement of a start marker and stop marker on the graphical waveform representation of FIG. 4 by the user.

In example illustrated in FIGS. 4 to 7, the user 10 places a fingertip (not shown) on the balloon icon 28a of the start-timer marker 28 displayed on the touch screen display 14a of the device 14 and slides the balloon icon laterally in direction D so as to place the start timer marker 28 on the peak (e.g., 20a) of the desired harmonic of the first returning wave 20. Similarly, the user subsequently places a fingertip on the balloon icon 30a of the stop-timer marker 30 as also displayed on the touchscreen display 14a of the device 14 and slides the balloon icon 30a laterally in a direction E so as to place the stop timer marker 30 on the peak 26a of the corresponding harmonic of the fourth returning wave 26 seen in FIG. 6. The placement of each marker 28, 30, is assisted by the user zooming in on or expanding the view of, or otherwise magnifying, firstly, the first returning wave 20 as seen in FIG. 7, and, secondly, the fourth returning wave 26. With both markers 28, 30 placed on the desired corresponding peaks (e.g., 20a, 26a respectively) and with the plot 32 on display 14a un-zoomed, un-expanded or un-magnified so that both markers 28, 30 can be seen simultaneously on the display as seen in FIG. 5, the time determination step is initiated. The time determination is the stop-timer marker 30 reading (in seconds) minus the start-timer marker 28 reading. This is generated by the device processor. Since the start and stop markers are placed on peaks of harmonics having the same profile, an accurate timing of the time elapsed is achieved. In the illustrated example in FIG. 5, the time determination is displayed as the time between markers 28, 30 along axis C. As stated above, the markers 28, 30 may be set on other corresponding peaks of earlier and later returning waves, other than the first and fourth returning wave, provided that the returning wave has sufficient amplitude so that its sequence of adjacent peaks may be detected by the accelerometers. Advantageously, the sensitivity of the accelerometers may be adjusted within the app; the example being shown in FIG. 1 of a default 0.3 g setting.

In one embodiment, the smart device in conjunction with the app may allow the user, if the user so wishes, to re-position a marker. In one embodiment, the user may need to first remove the marker, before zooming in on a different portion of the graphical waveform representation and re-placing the marker. Thus the earlier position of the marker is lost. The user may be able to use different zoom levels to gradually "home in" on the point on the graphical waveform representation which the user wishes to mark. As described above, such zoom control interfaces are known in the art.

In one embodiment, the start and stop markers are insertion markers such as a cursor, an insertion bar, an insertion point, or a pointer.

As explained above, the user uses the touch screen of the device to zoom in on the return waves displayed on the device's screen, which, upon enlargement, show that each return wave is a grouping of small waves or harmonics.

In one embodiment, the user uses a pair of horizontally slidable insertion markers (see FIG. 5) to mark where the elapsed time on the graph is to be measured from and where the timing is to be stopped. In one embodiment, the markers each have a finger button such as a balloon icon for the user to hold the tip of the user's finger against, which then allows the user to slide each marker back and forth on the touch screen, horizontally along the elapsed time axis, using a light finger pressure on the marker button. With the first return wave enlarged so as to show it's harmonics (as seen in FIG. 7), the user slides the marker onto the top of a peak of one of the harmonics, say the first one. That flagged harmonic then becomes where the timing starts. The user then shifts over to, and zooms in on the fourth return wave on the graph. The user then slides the second marker onto the same harmonic (in the case of this example, the first harmonic) on the fourth return wave as was used to mark the first return wave. See FIG. 6. With this done, the elapsed time for the line sag formula is accurately now the exact time between the two marked harmonics. All of this is done conveniently on the job site, in fact without the user necessarily even moving from under the power line, and is completed within minutes by the user. Again, the exactness of the measured time between the corresponding harmonics in the returning waves as determined by the placement of the start and stop timing markers provides exactness in the calculated line sag because errors in the timing measurement are squared, resulting in correspondingly larger errors in the calculated line sag.

What is claimed is:

1. A method for calculating line sag in a power line suspended between at least two supports, the method comprising:

providing a smart device having an accelerometer, a display, a user interface, a processor, a memory, and at least one resident application residing in the memory;

temporarily coupling the smart device to the power line;

launching the at least one resident application;

inducing a mechanical wave on the power line so that the mechanical wave generates a plurality of return waves in the power line;

using the at least one resident application, recording acceleration of a subset of the plurality of return waves and corresponding vertical acceleration of the smart device, wherein a first return wave of the subset has a first number of harmonics and wherein a subsequent second return wave of the subset has a second number of harmonics, and wherein the first number of harmonics is equal to the second number of harmonics;

recording timings of the subset of the plurality of return waves;

within the at least one resident application, and using the recorded acceleration and timings, generation a graphical waveform representation of the subset of the plurality of return waves and displaying the graphical waveform representation on the display;

using the user interface to magnify the displayed graphical waveform representation so as to view the harmonics of each of the subset of return waves;

selecting a harmonic of a first return wave of the subset of the plurality of return waves and using the user interface to place a start marker on a displayed inflection of the selected harmonic of the first return wave;

selecting a harmonic of a second return wave of the subset of the plurality of return waves and, using the user interface, placing a stop marker on a corresponding inflection of the corresponding selected harmonic of the second return wave;

within the resident application: calculating a time delay between the start marker and the stop marker, and calculating the line sag using the time delay.

2. The method of claim 1, wherein the smart device is a smart phone having a touch sensitive screen and the magnifying step includes a multi-fingered swipe gesture on the touch sensitive screen.

3. The method of claim 2, wherein the inflection is a peak and the step of placing the start and stop markers includes tapping a region of the peak of the selected harmonic for placement of an insertion marker on the peak.

4. The method of claim 2, wherein the inflection is a peak and the step of placing the start and stop markers includes touching and holding an insertion marker displayed on the screen and subsequently moving the insertion marker to the peaks of the selected harmonics for location thereon as the start and stop markers.

5. The method of claim 4, wherein the step of moving includes a sliding finger gesture on the touch sensitive screen.

6. The method of claim 1, wherein the start and stop markers are insertion markers chosen from the group comprising a cursor, an insertion bar, an insertion point, a pointer.

7. The method of claim 1, wherein the step of coupling includes encasing the smart device in a sheath and releasably connecting the encased smart device to an end of a dielectric pulling member suspended downwardly from the power line.

8. A portable, modular system for calculating line sag in a power line suspended between at least two supports, the system comprising:

a smart device including an accelerometer, a display and a user interface;

a coupler for temporarily coupling the smart device to the power line;

at least one executable application resident in the smart device that, in operation, performs the following steps:

records acceleration of a subset of a plurality of return waves generated in the power line and corresponding vertical acceleration of the smart device;

records timings of the subset of return waves;

generates a graphical waveform representation of the subset of return waves using the recorded acceleration and timings and displays the graphical waveform representation on the display, wherein a first return wave of the subset has a first number of harmonics and wherein a subsequent second return wave of the subset has a second number of harmonics, and wherein the first number of harmonics is equal to the second number of harmonics;

provides means for:

using the user interface to magnify the displayed graphical waveform representation so as to view the harmonics of each of the subset of return waves;

selecting a harmonic of a first return wave of the subset of the plurality of return waves and using the user interface to place a start marker on a displayed inflection of the selected harmonic of the first return wave;

selecting a harmonic of a second return wave of the subset of the plurality of return waves and, using the user interface, placing a stop marker on a corresponding inflection of the corresponding selected harmonic of the second return wave;

calculates a time delay between the start marker and the stop marker; and calculates the line sag using the time delay.

9. The system of claim 8, wherein the smart device is a smart phone and the user interface is a touch sensitive screen of the smart phone.

10. The system of claim 8, wherein the coupler includes a dielectric pulling member adapted to be suspended downwardly from the power line and at least a carabiner to releasably couple the smart device to a free end of the dielectric pulling member.

* * * * *